(12) United States Patent
Bradley (10) Patent No.: US 9,370,965 B2
(45) Date of Patent: Jun. 21, 2016

(54) TRUCK WHEEL TURBULENCE SHIELD

(71) Applicant: Jesse L. Bradley, Salina, KS (US)

(72) Inventor: Jesse L. Bradley, Salina, KS (US)

( * ) Notice: Subject to any disclaimer, the term of this patent is extended or adjusted under 35 U.S.C. 154(b) by 150 days.

(21) Appl. No.: 14/280,871

(22) Filed: May 19, 2014

(65) Prior Publication Data

US 2015/0328923 A1    Nov. 19, 2015

(51) Int. Cl.
*B60B 7/00* (2006.01)
*B60B 7/06* (2006.01)
*B60B 7/12* (2006.01)

(52) U.S. Cl.
CPC ............ *B60B 7/0013* (2013.01); *B60B 7/0073* (2013.01); *B60B 7/063* (2013.01); *B60B 7/12* (2013.01)

(58) Field of Classification Search
CPC .... B60B 7/0013; B60B 7/0073; B60B 7/063; B60B 7/12
USPC ................. 301/37.103, 37.102, 37.31, 37.32, 301/37.33, 37.34
See application file for complete search history.

(56) References Cited

U.S. PATENT DOCUMENTS

| 1,167,124 A | | 1/1916 | Sloper | |
|---|---|---|---|---|
| 1,406,945 A | | 2/1922 | Kilborn | |
| 2,304,583 A | * | 12/1942 | Lyon | B60B 7/0073 301/37.34 |
| 2,624,639 A | * | 1/1953 | Lyon | B60B 7/02 301/37.32 |
| 2,790,682 A | * | 4/1957 | Lyon | B60B 7/0013 301/37.39 |
| 2,893,785 A | | 7/1959 | Lyon | |
| 2,926,955 A | * | 3/1960 | Lyon | B60B 7/105 301/37.34 |
| 2,927,824 A | | 3/1960 | Simon | |
| 3,004,798 A | | 10/1961 | Tylle | |
| 3,036,867 A | * | 5/1962 | Lyon | B60B 7/02 301/37.34 |
| 3,973,801 A | | 8/1976 | Beisch et al. | |
| 4,094,550 A | * | 6/1978 | Toal | B60C 7/06 29/894.381 |
| 4,202,582 A | | 5/1980 | Seltman | |
| 4,291,921 A | * | 9/1981 | Wulf | B60B 7/06 301/108.1 |
| 4,418,962 A | | 12/1983 | Schaffer | |
| 4,512,614 A | * | 4/1985 | Loper | B60B 7/12 301/37.34 |
| 4,595,212 A | | 6/1986 | Haury et al. | |

(Continued)

FOREIGN PATENT DOCUMENTS

| CA | 2698664 | 9/2007 |
|---|---|---|
| CN | 203046332 | 7/2013 |

(Continued)

*Primary Examiner* — Hau Phan
*Assistant Examiner* — Jacob Meyer
(74) *Attorney, Agent, or Firm* — Kenneth H. Jack; Davis & Jack, L.L.C.

(57) ABSTRACT

A turbulence shield for attachment to a truck wheel having a laterally outer edge about a laterally opening concavity, and having an annular channel which opens radially inwardly at the laterally outer edge, the turbulence shield having a first annularly extending "C" member opening radially inwardly and fitted for nesting receipt within the annular channel; a second annularly extending "C" member opening radially inwardly and nestingly received within the first "C" member's channel, the second annularly extending "C" member having arms; a hoop member nesting within the second "C" member; a circular flexible sheet; and an integral joint interconnecting the sheet's edge and a second "C" member's arm so that, upon nesting the first "C" member within the wheel's annular channel, the sheet covers the wheel's laterally opening concavity.

9 Claims, 7 Drawing Sheets

(56) References Cited

U.S. PATENT DOCUMENTS

| | | | | |
|---|---|---|---|---|
| 4,603,915 | A * | 8/1986 | Heintz | B60B 7/12 301/37.34 |
| 4,645,269 | A * | 2/1987 | Brown | B60B 7/12 301/37.34 |
| 4,712,838 | A * | 12/1987 | Berg | B60B 7/0006 301/37.41 |
| 4,760,891 | A * | 8/1988 | Moss | B60K 11/08 180/65.51 |
| D303,648 | S | 9/1989 | Clark | |
| 4,991,909 | A * | 2/1991 | Hamada | B60B 7/12 301/37.36 |
| 6,059,375 | A * | 5/2000 | Shryock | B60B 7/10 301/37.109 |
| 6,059,376 | A * | 5/2000 | Shryock | B60B 7/10 301/37.109 |
| 6,598,942 | B1 * | 7/2003 | Williams | B60B 7/063 301/37.101 |
| 6,886,891 | B2 * | 5/2005 | Hara | B60B 7/02 301/37.32 |
| 7,303,240 | B2 * | 12/2007 | Lin | B60B 7/12 301/37.102 |
| RE42,140 | E * | 2/2011 | Kemmerer | B60B 7/0013 301/37.11 |
| 8,382,210 | B1 * | 2/2013 | Fleck | B60B 7/04 301/37.102 |
| 8,459,752 | B2 | 6/2013 | Russell | |
| 8,783,788 | B2 * | 7/2014 | Fleck | B60B 7/12 301/37.102 |
| 8,939,517 | B2 * | 1/2015 | Fleck | B60B 7/10 301/37.102 |
| 9,039,101 | B1 * | 5/2015 | Danto | B60B 7/06 301/37.102 |
| 9,039,857 | B2 * | 5/2015 | Nakamura | B60B 7/065 156/247 |
| 2003/0137187 | A1 * | 7/2003 | Williams | B60B 7/063 301/37.103 |
| 2003/0168906 | A1 * | 9/2003 | Mosher | B60B 7/0073 301/37.101 |
| 2005/0012383 | A1 * | 1/2005 | Hsieh | B60B 7/14 301/37.102 |
| 2011/0101767 | A1 * | 5/2011 | Fleck | B60B 7/12 301/37.101 |
| 2011/0148181 | A1 * | 6/2011 | Silva de Carvalho | B60B 7/0046 301/37.102 |
| 2011/0241411 | A1 * | 10/2011 | Fynn | B60B 7/01 301/37.24 |
| 2012/0007414 | A1 * | 1/2012 | Posey | B60B 7/08 301/37.102 |
| 2012/0181849 | A1 | 7/2012 | Rogers et al. | |
| 2012/0217791 | A1 * | 8/2012 | Milicevic | B60B 7/01 301/37.34 |
| 2013/0015698 | A1 * | 1/2013 | Butler | B60B 7/0013 301/37.29 |
| 2013/0234497 | A1 * | 9/2013 | Franklin | B60B 3/00 301/37.24 |
| 2013/0241268 | A1 | 9/2013 | Wang | |
| 2014/0090775 | A1 * | 4/2014 | Nakamura | B60B 7/065 156/235 |
| 2014/0265533 | A1 * | 9/2014 | Polka | B60B 7/14 301/37.102 |
| 2015/0145317 | A1 * | 5/2015 | Wills | B60B 7/02 301/37.102 |
| 2015/0158331 | A1 * | 6/2015 | Fleck | B60B 7/10 301/37.102 |
| 2016/0001593 | A1 * | 1/2016 | Gielisch | B60B 7/02 301/37.11 |

FOREIGN PATENT DOCUMENTS

| | | |
|---|---|---|
| CN | 202965799 | 6/2014 |
| EP | 2588326 | 5/2013 |
| GB | 126718 | 5/1919 |
| WO | WO8700802 | 2/1987 |
| WO | WO9710987 | 3/1997 |
| WO | WO0054991 | 9/2000 |
| WO | WO2013009729 | 1/2013 |
| WO | WO2013181473 | 12/2013 |

* cited by examiner

TRUCK WHEEL TURBULENCE SHIELD

FIELD OF THE INVENTION

This invention relates to vehicle wheels. More particularly, this invention relates to truck wheels and coverings therefore.

BACKGROUND OF THE INVENTION

Steel truck wheels commonly present a laterally outwardly opening concavity which, upon swift passage of the wheel through the air during road travel, produces within the concavity a localized zone of relatively low atmospheric pressure. Such low pressure zone continually draws currents of air into the wheel's concavity, and generates turbulent air flow therein. The existence of such motion induced air pressure drop and air turbulence within a truck wheel's laterally outwardly opening concavity is known to increase air resistance and atmospheric frictional drag against the truck vehicle as it moves along a roadway, and is known to reduce fuel efficiency.

The instant inventive truck wheel turbulence shield solves or ameliorates the problems, defects, and deficiencies noted above by providing a "snap on" type wheel insert which is capable of shielding and preventing air turbulence within the wheel's concavity. The instant inventive shield is easily, economically, and inexpensively fabricated, and it promotes mechanical simplicity with minimal manually performed steps required in installations and de-installations of the shield.

BRIEF SUMMARY OF THE INVENTION

The instant inventive turbulence shield is intended and specially adapted for attachment to a common steel truck wheel of the type which has a laterally outer edge which extends circularly about a laterally opening central concavity. Provided that a truck wheel presents, as is common, an annular channel which is positioned at the wheel's laterally outer edge and which opens radially inwardly, such wheel may receive and utilize the instant inventive turbulence shield.

A first structural component of the instant inventive turbulence shield comprises a first annularly, circularly, or circumferentially extending "C" member which forms and defines a substantially circular and radially inwardly opening channel. The annular outer periphery of such first "C" member is preferably closely fitted for "snap-on" type nesting receipt within, and for secure retention within, the truck wheel's annular and radially inwardly opening channel.

In the preferred embodiment, the first annularly extending "C" member is composed of flexible and durable plastic. Suitably, such "C" member may alternatively be formed of aluminum or stainless steel. Preferably, such member is further adapted for function as a circular "C" clip which spring biases to a normal reduced diameter.

A further structural component of the inventive turbulence shield comprises a second annularly extending "C" member which, like the first "C" member, forms a radially inwardly opening channel. In the preferred embodiment, the second "C" member is fitted to and is nestingly received with the annular channel or concavity of the first "C" member. In the preferred embodiment, the second "C" member bounds its annular channel with a formed pair of or outer and inner radially inwardly extending arms. In the preferred embodiment, the second "C" member is composed of flexible sheet material.

A further structural component of the instant inventive turbulence shield comprises an annular or circularly extending bar or hoop member which is preferably nestingly received within the channel or concavity formed by the second annularly extending "C" member.

A further structural component of the instant inventive turbulence shield comprises a round flexible sheet having a substantially circular radially outer edge. The flexible sheet component may advantageously be composed of fabric, preferably a box or square weave of a durable synthetic fiber such as nylon or polyester.

A further structural component of the instant inventive turbulence shield comprises first fastening means which are preferably adapted for fixedly and securely attaching the flexible sheet's radially outer edge to one of the arms among the second "C" member's pair of radially inwardly extending arms. The first fastening means' connection resides at the second "C" member's outer arm, such position being preferred in order to prevent turbulent flapping of an exposed distal arm end. The first fastening means preferably position and secure the flexible sheet so that, upon an insertion of the first annularly extending "C" member (along with the second "C" channel member and bar members carried within the first "C" channel member) into the wheel's annular channel the flexible sheet may cover and close the wheel's laterally opening concavity. In a preferred embodiment, the first fastening means comprises a wholly formed or integrally woven interconnection or joint between the second "C" channel's arm and the radially outer edge of the flexible sheet. Suitably, the first fastening means may alternatively comprise a fastener selected from the group consisting of adhesive bonds, thermally welded bonds, sewn or stitched bonds, hook and loop pad fasteners, hook and eye fasteners, and magnetic fasteners.

In a preferred embodiment of the instant inventive turbulence shield, second fastening means are provided and are further structurally incorporated, such means being adapted for hemming the second annularly extending "C" member over and about the annularly extending bar. The second fastening means preferably comprise sewn stitching and may suitably alternatively comprise an adhesive bond or a thermally welded bond. The second fastening means are preferably positioned for securely interconnecting the second "C" member's pair of arms.

In the preferred embodiment, the first annularly extending "C" member comprises and effectively functions as an additional or third fastening means by virtue of an inwardly extending spring force. Provided that the normal inside diameter of the first "C" member's channel is less than the combined outside diameters of the bar and the second "C" member, the first "C" member may, upon a "snap-on" type installation upon and about the bar and the second "C" member, advantageously exert against such underlying structures a further fastening and attaching force. The circular bar preferably comprises an aluminum or aluminum alloy and may suitably alternatively comprise flexible and durable plastic.

Preliminary to roadway use of the instant inventive turbulence shield, an operator may easily and conveniently snap the shield into place within a truck wheel's outer lip annular channel. Upon such installation, air currents advantageously travel over the laterally outer surface of the shield's flexible sheet instead of turbulently entering the wheel's concavity.

Accordingly, objects of the instant invention include the provision of a turbulence shield which incorporates structures as described above, and which arranges those structures in relation to each other in manners described above for achievement of the advantages and benefits described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT OF THE INVENTION

Figure 1:
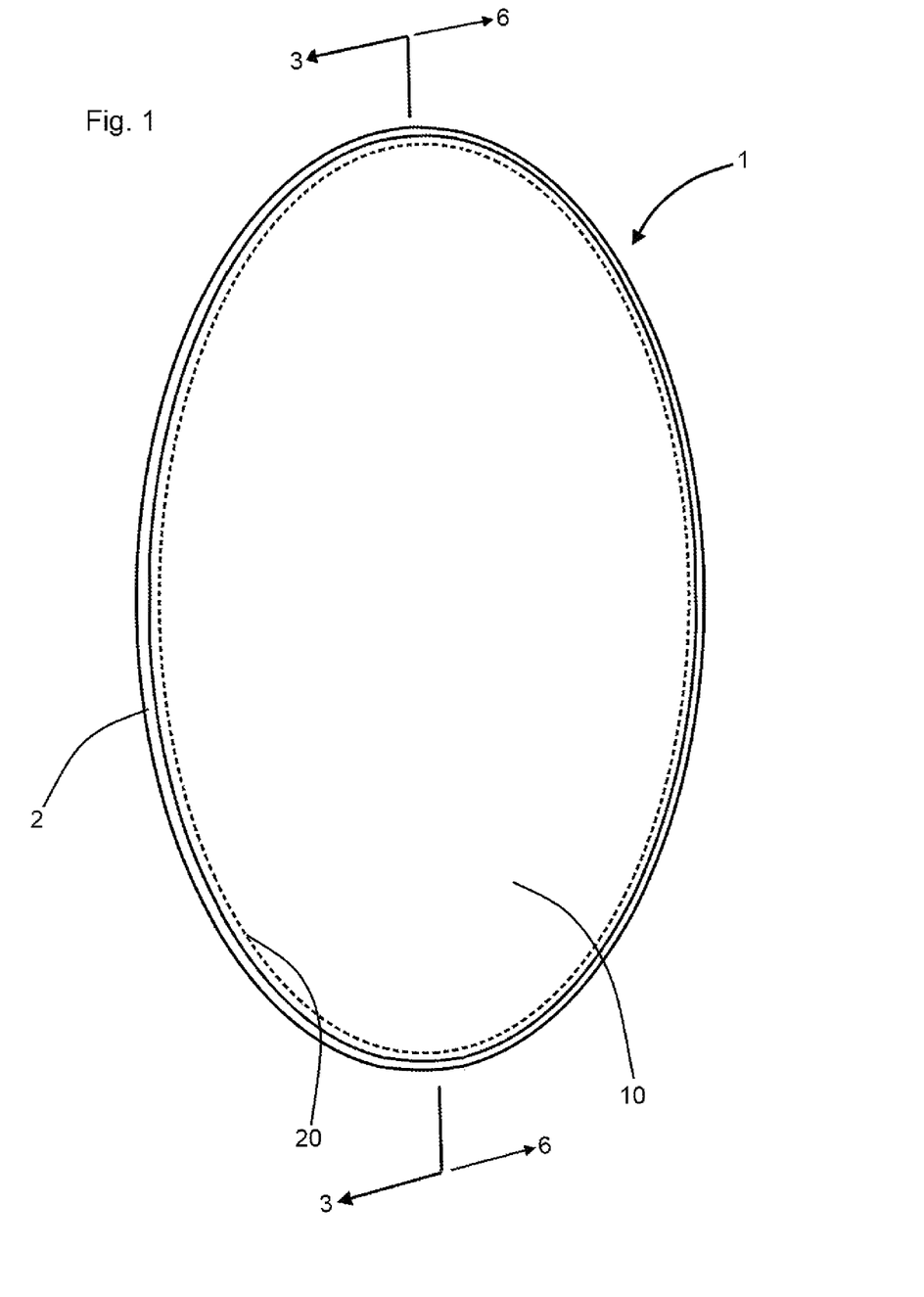
FIG. 1 is a perspective view of the instant inventive turbulence shield.
Figure 2:
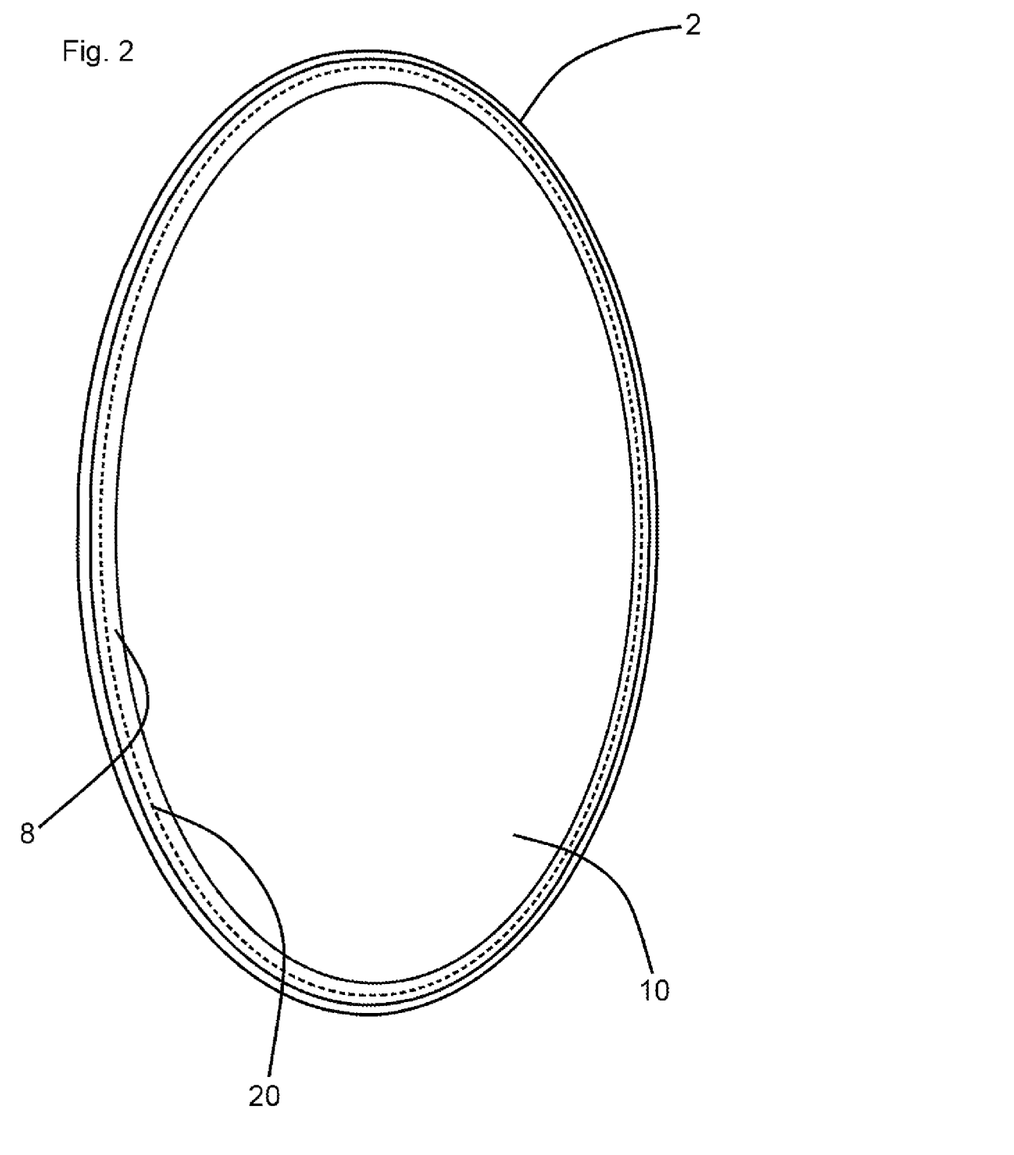
FIG. 2 is a reverse or opposite side view of the structure depicted in FIG. 1.
Figure 3:
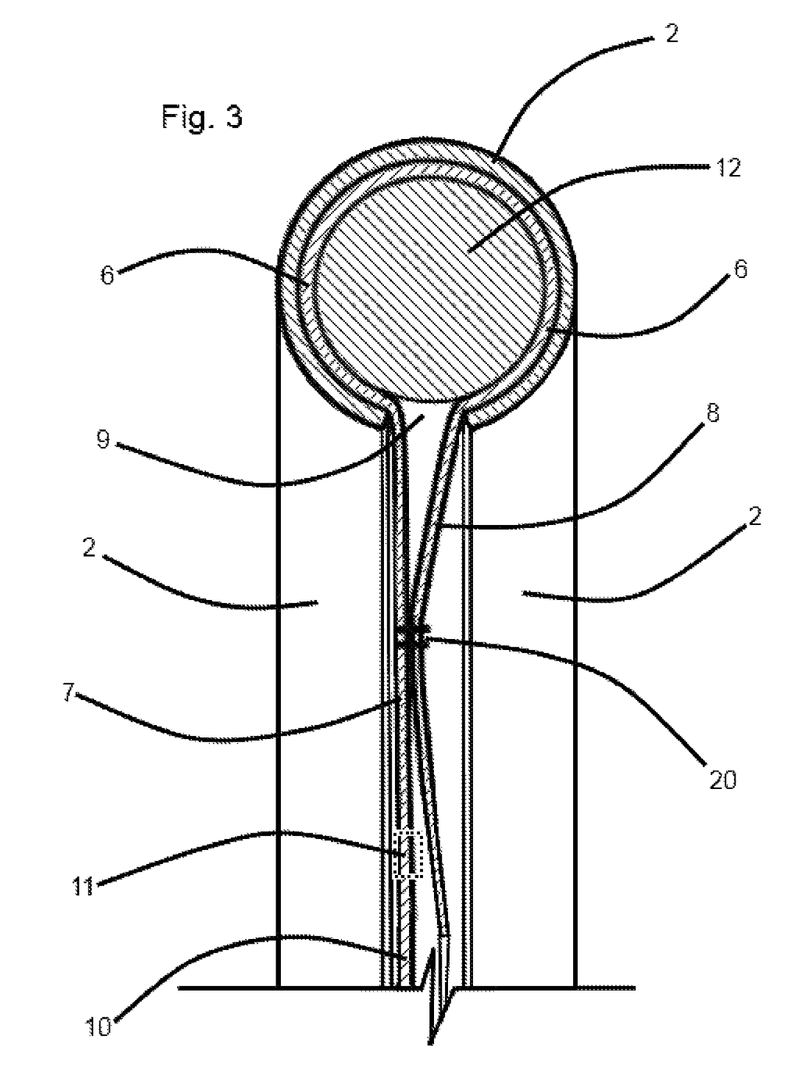
FIG. 3 is a partial sectional view as indicated in FIG. 1.

Referring now to the drawings, and in particular to Drawing FIGS. 1 and 3, a preferred embodiment of the instant inventive turbulence shield is referred to generally by Reference Arrow 1. The turbulence shield 1 preferably comprises a first annularly, circularly, or circumferentially extending "C" channel member 2. In a preferred embodiment, the "C" channel member is composed of flexible and durable plastic, and is adapted for enveloping and nestingly receiving underlying structures while exerting a fastening spring force there against.

The inventive turbulence shield 1 preferably further comprises a second annularly extending "C" member 6, such member having and forming a laterally outer "C" channel arm 7 and a laterally inner "C" channel arm 8. In a preferred embodiment, the second "C" member 6,7,8 is composed of a woven synthetic fabric such as nylon or polyester, and is fitted and shaped for nesting receipt and retention within the concavity 9 formed by the first "C" member 2. An annularly or circularly extending bar or hoop member 12 is preferably nestingly received and securely held within the concavity formed by the second "C" member 6,7,8, such bar 12 preferably being composed of aluminum or plastic.

A thin and durable flexible sheet 10 is preferably provided, such sheet being circularly configured and being composed of a box or square weave of durable synthetic fiber such as nylon or polyester.

First fastening means which are adapted for securely interconnecting the circular flexible sheet 10 and one of the second "C" member's arms, 7 or 8, are provided. Such first attaching means preferably comprise a wholly formed or integrally woven joint as designated by dashed line box 11 drawn upon FIG. 3. Such fastening means preferably connect at the laterally outer arm 7 to avoid exposure to air turbulence of a distal end of a loose radially inner arm. Suitably, such first fastening means may alternatively comprise a fastener selected from the group of sewn joints, adhesively bonded joints, thermally welded joints, hook and eye fasteners, hook pad and loop pad fasteners, and magnetic fasteners, each of which is intended as being represented by dashed line box 11.

Second fastening means in the form of sewn stitches 20 are preferably provided, such means being adapted for securely laterally interconnecting the arms 7 and 8 of the second "C" member 6. Such second fastening means advantageously hem such member 6 at the radially outer periphery of the flexible sheet 10 and about the circular bar 12. Suitably, such second fastening means may alternatively comprise an adhesive bond or a thermal weld.

Figure 4:
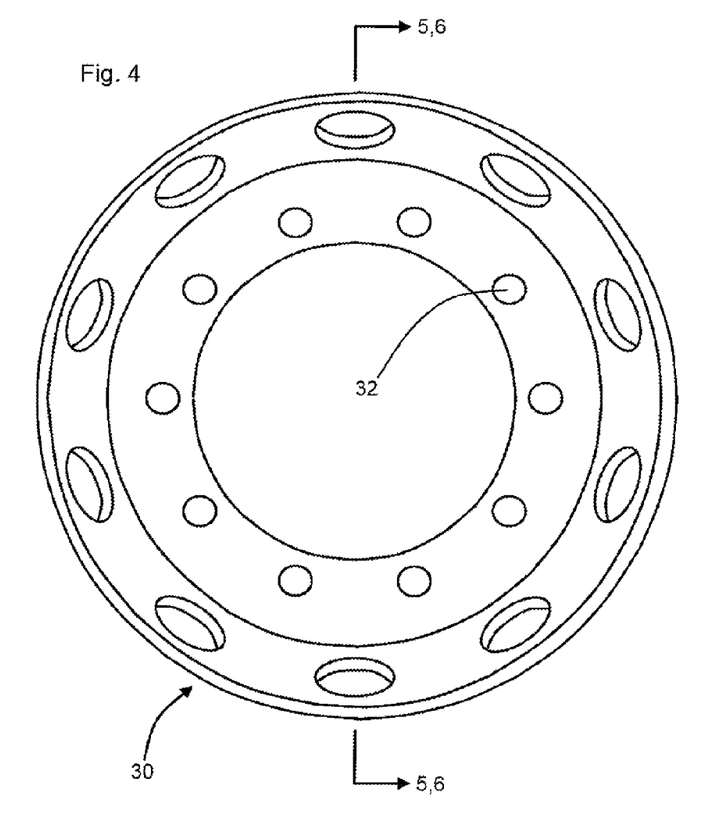
FIG. 4 is a lateral side view of an exemplary truck wheel upon which the instant inventive turbulence shield may be installed.
Figure 5:
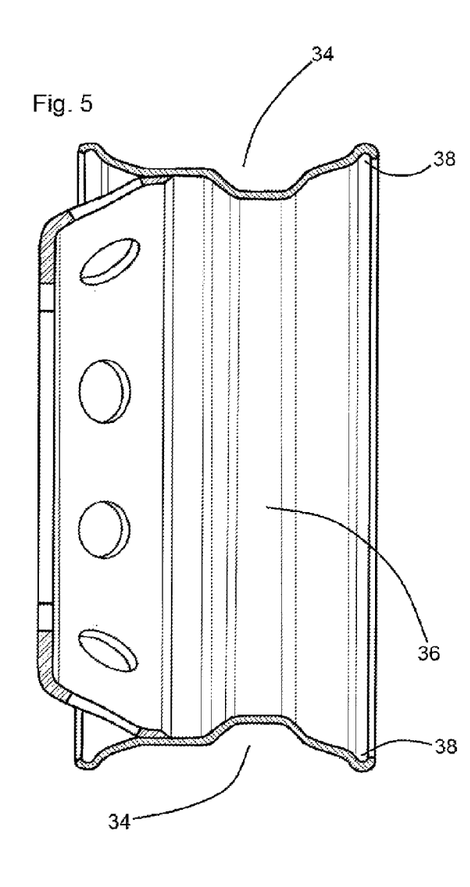
FIG. 5 is a sectional view as indicated in FIG. 4.
Figure 6:
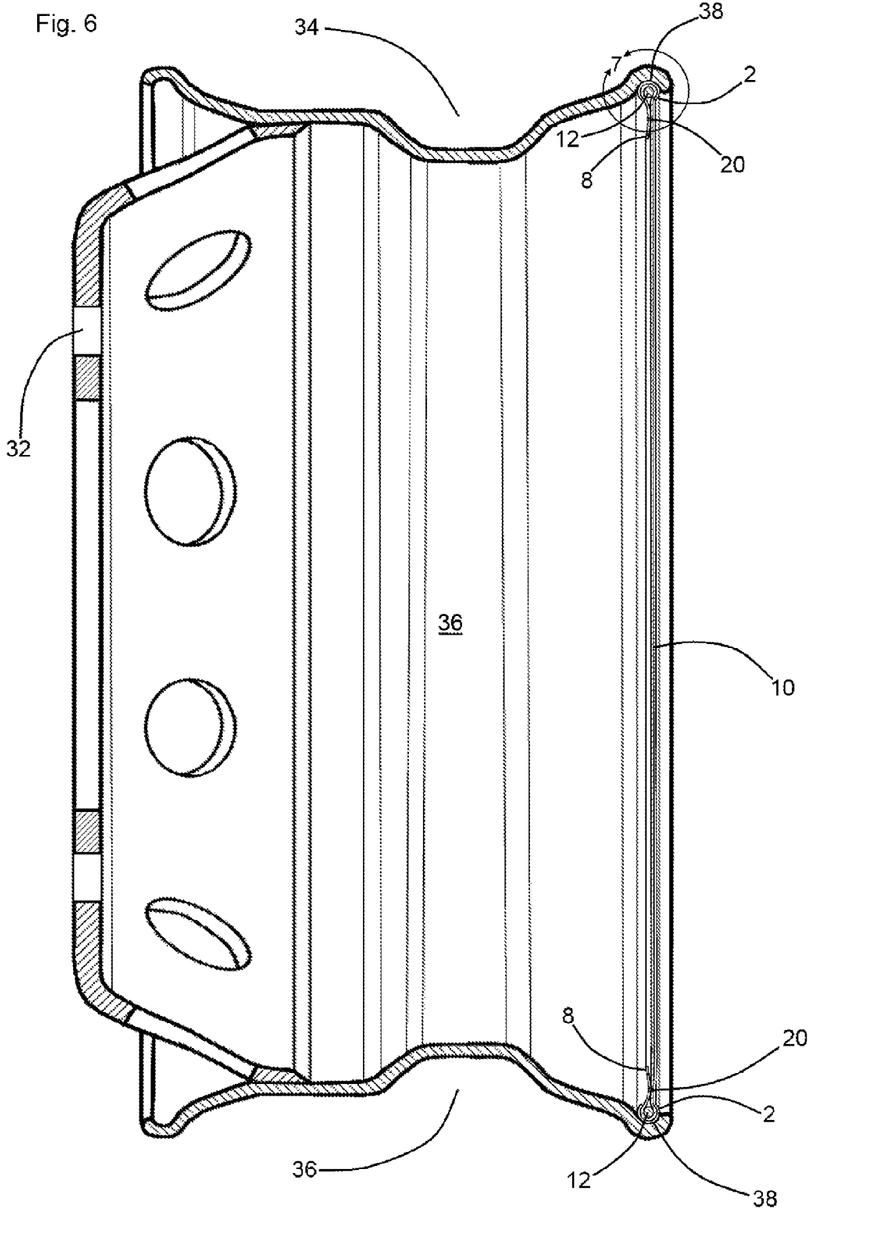
FIG. 6 is a sectional view as indicated in FIGS. 1 and 4.
Figure 7:
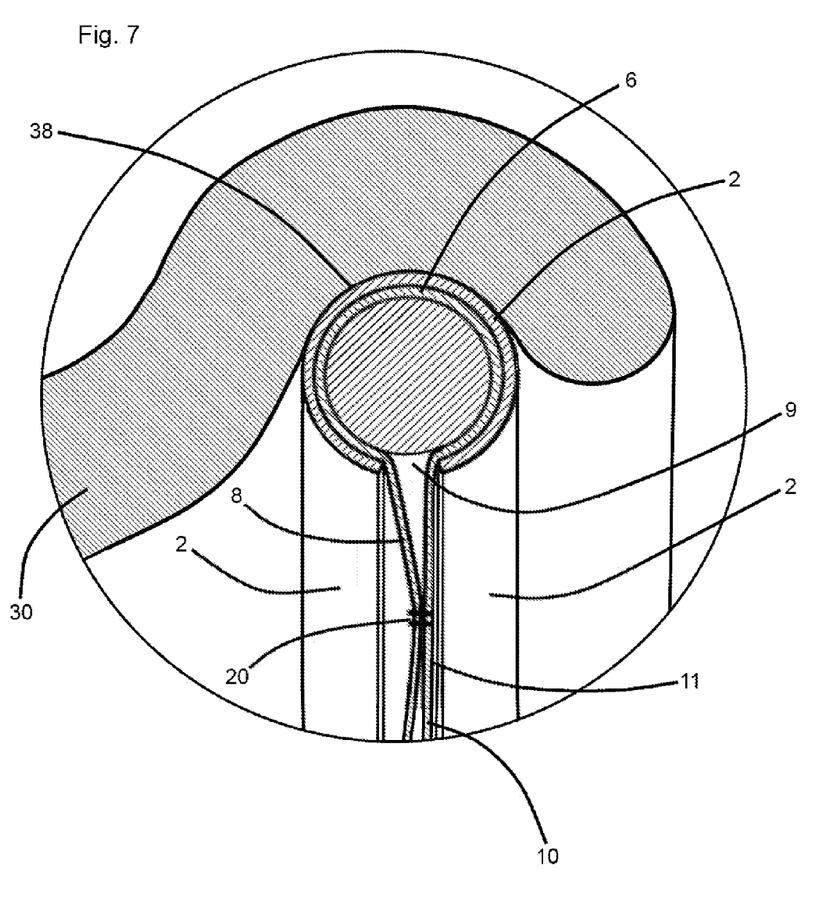
FIG. 7 is a magnified portion of the structure of FIG. 6, as indicated in FIG. 6.

Referring simultaneously to FIGS. 4 and 5, a common steel truck wheel 30 is depicted, such wheel presenting a plurality of mounting lug receiving eyes 32 at the base of a laterally outwardly opening concavity 36, and such wheel forming an annular and radially outwardly opening channel 34 for truck tire mounting. Such truck wheels 30 commonly present at the laterally outer periphery of concavity 36 an annular and radially inwardly opening channel 38. Referring further simultaneously to FIGS. 1, 6, and 7, the instant inventive turbulence shield 1 may be easily and conveniently snapped into place within channel 38 at the laterally outer aspect of concavity 36 of wheel 30 so that the first "C" member 2 becomes securely and nestingly mounted. Upon such installation of the turbulence shield 1 as indicated in FIGS. 6 and 7, and upon swift movement of the wheel 30 and shield 1 combination through the air, air currents advantageously skim along and over the laterally outer surface of the flexible sheet 10 without any undesirable and air drag increasing entry of air currents into concavity 36. Accordingly, the instant inventive turbulence shield 1 streamlines the wheel 30 and enhances truck fuel economy.

Figure 8:
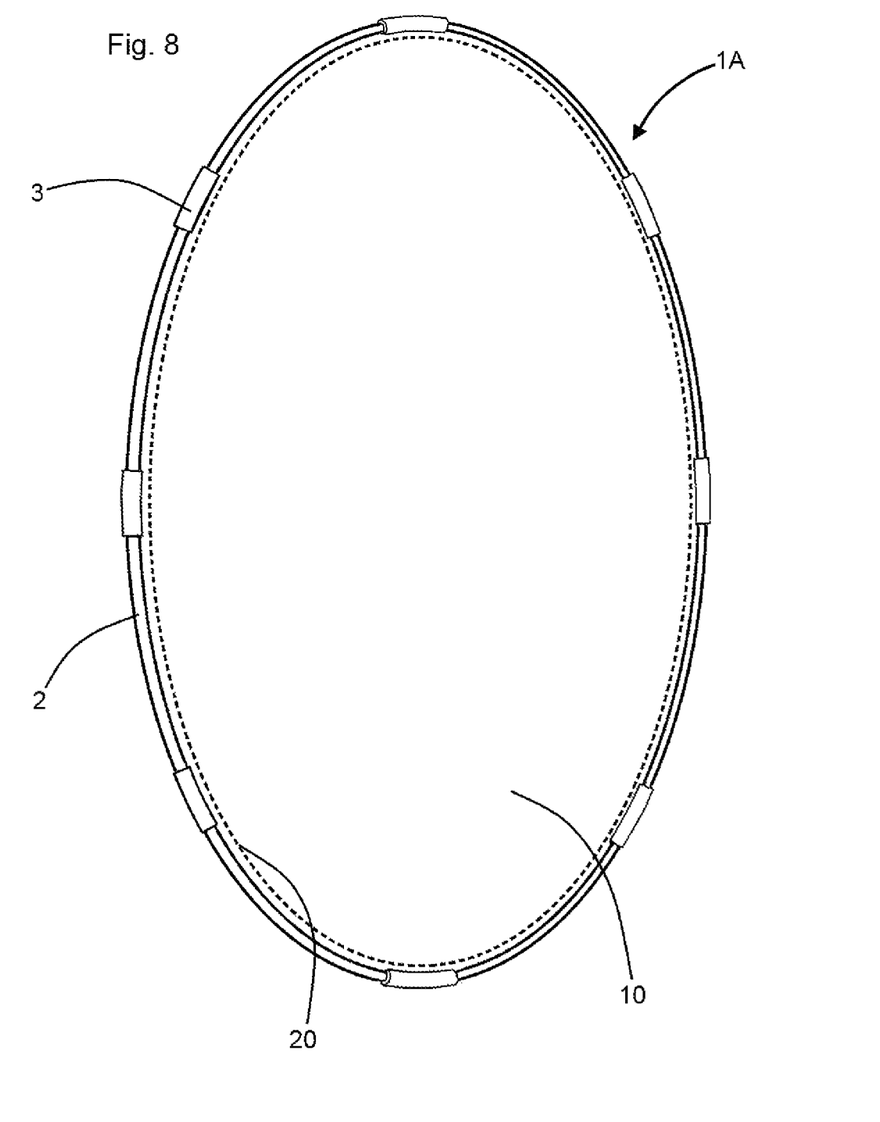
FIG. 8 presents an alternative configuration of the structure presented in FIG. 1.

In the alternate configuration depicted in FIG. 8, additional and variously sized "C" channel or "C" clip members 3 may be snapped over and circumferentially arrayed about "C" member 2, such "C" clips 3 being useful for precisely fitting the effective outside diameter of the turbulence shield 1 to a particular wheel lip inside diameter.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A turbulence shield for attachment to a truck wheel, the truck wheel having a laterally outer edge extending about a laterally opening concavity, and the truck wheel having an annular channel opening radially inwardly and positioned at the laterally outer edge, the turbulence shield comprising:
   (a) a first annularly extending "C" member having a radially inwardly opening channel, said member being fitted for nesting receipt within the truck wheel's annular channel;
   (b) a second annularly extending "C" member having a radially inwardly opening channel, said member being nestingly received within the first annularly extending "C" member's channel, the second annularly extending "C" member comprising a pair of radially inwardly extending arms;
   (c) an annularly extending bar nestingly received within the second annularly extending "C" member's channel;
   (d) a flexible sheet having a radially outer edge; and
   (e) first fastening means interconnecting the flexible sheet's radially outer edge and one of the arms among the second "C" channel member's pair of radially extending arms, said interconnection positioning the flexible sheet for, upon the nesting receipt of the first annularly extending "C" member within the truck wheel's annular channel, covering the truck wheel's laterally opening concavity.

2. The turbulence shield of claim 1 wherein the flexible sheet comprises fabric, wherein the second annularly extending "C" member comprises fabric, and wherein the first fastening means comprise an integrally woven joint.

3. The turbulence shield of claim 2 wherein the pair of radially inwardly extending arms comprise a laterally outer arm and a laterally inner arm, and wherein the integrally woven joint is positioned at the laterally outer arm.

4. The turbulence shield of claim 2 further comprising second fastening means adapted for hemming the second annularly extending "C" member over the annularly extending bar.

5. The turbulence shield of claim 4 wherein the second fastening means comprise stitches.

6. The turbulence shield of claim 5 wherein the first annularly extending "C" member comprises flexible plastic.

7. The turbulence shield of claim 6 wherein the first annularly extending "C" member is adapted for exerting a compressive spring force against the second annularly extending "C" member and against the annularly extending bar, and further comprising third fastening means, the third fastening means comprising said compressive spring force exertion adaptation.

8. The turbulence shield of claim 7 wherein the flexible sheet comprises square woven fabric.

9. The turbulence shield of claim 8 wherein the annularly extending bar comprises aluminum or plastic.

* * * * *